US008828501B1

(12) United States Patent
Oki et al.

(10) Patent No.: US 8,828,501 B1
(45) Date of Patent: Sep. 9, 2014

(54) DRYING METHOD AND DRYING APPARATUS FOR COATING LAYER

(75) Inventors: Kazuhiro Oki, Minami-Ashigara (JP); Takeshi Kitaoka, Minami-Ashigara (JP)

(73) Assignee: Fujifilm Corporation, Tokyo (JP)

( * ) Notice: Subject to any disclaimer, the term of this patent is extended or adjusted under 35 U.S.C. 154(b) by 537 days.

(21) Appl. No.: 11/892,073

(22) Filed: Aug. 20, 2007

Related U.S. Application Data

(62) Division of application No. 10/809,501, filed on Mar. 26, 2004.

(30) Foreign Application Priority Data

Mar. 26, 2003 (JP) ................................. 2003-084846
Mar. 26, 2003 (JP) ................................. 2003-084847

(51) Int. Cl.
*B29C 71/02* (2006.01)
*B29C 71/04* (2006.01)
*B05D 3/06* (2006.01)
*B05D 3/02* (2006.01)

(52) U.S. Cl.
USPC ........... 427/542; 427/557; 427/377; 427/378; 427/379

(58) Field of Classification Search
None
See application file for complete search history.

(56) References Cited

U.S. PATENT DOCUMENTS 3,581,060 A * 5/1971 Bauer et al. .................. 219/469
3,965,851 A * 6/1976 Cohn ........................... 118/712
4,051,278 A * 9/1977 Democh ....................... 427/326
4,404,699 A * 9/1983 Sando et al. .................. 8/149.1
4,657,625 A * 4/1987 Kawakami .................... 156/471
4,694,586 A * 9/1987 Reznik ............................ 34/247
4,887,365 A 12/1989 Oda
4,999,927 A * 3/1991 Durst et al. ...................... 34/448
5,039,549 A * 8/1991 Nguyen et al. ................ 427/513
5,168,639 A 12/1992 Hebels
5,285,844 A * 2/1994 Schneid .......................... 165/89
5,393,290 A * 2/1995 Lehmann et al. ............... 492/16

(Continued)

FOREIGN PATENT DOCUMENTS

DE 1918902 A * 4/1969
GB 1 401 041 5/1972

(Continued)

OTHER PUBLICATIONS

Machine translation JP 2001-314798 A, by Tobisawa Seiichi, published Nov. 13, 2001.*

(Continued)

*Primary Examiner* — Marianne L Padgett
(74) *Attorney, Agent, or Firm* — Young & Thompson

(57) ABSTRACT

A coating solution is applied to a web to form a coating layer. Then the web is transported into a drying apparatus, in which a guide roller guides the web such that an angle of the web to a horizontal direction is smaller downstream from the guide roller. The angles at entrance and exit of the drying apparatus are named entrance and exit angles $\theta 1$, $\theta 3$, respectively, and satisfy a condition $\theta 1 > \theta 3$. The coating layer has the temperature T1 at the entrance, the temperature T2 at the exit, and the temperature T3 in the drying apparatus. The differences $|T2-T1|$ and $|T3-T1|$ are at most 5° C. In the drying apparatus, as the organic solvent evaporates uniformly, the generation of the unevenness is reduced. Thereafter, the drying is made at the large drying speed in the blow-drying apparatus to obtain a film product.

14 Claims, 7 Drawing Sheets

(56) References Cited

U.S. PATENT DOCUMENTS

| | | | | |
|---|---|---|---|---|
| 5,484,370 | A * | 1/1996 | Jenke et al. | 492/4 |
| 5,613,307 | A * | 3/1997 | Conrad et al. | 34/425 |
| 5,881,476 | A * | 3/1999 | Strobush et al. | 34/451 |
| 5,906,862 | A * | 5/1999 | Yapel et al. | 427/378 |
| 5,972,667 | A * | 10/1999 | Conia et al. | 435/173.2 |
| 6,295,825 | B1 * | 10/2001 | Jin | 62/238.7 |
| 6,306,261 | B1 * | 10/2001 | Meschenmoser et al. | 162/358.5 |
| 7,182,813 | B2 * | 2/2007 | Endo et al. | 118/65 |
| 7,526,878 | B2 * | 5/2009 | Sonobe et al. | 34/266 |
| 7,611,747 | B2 * | 11/2009 | Onishi et al. | 427/97.6 |
| 8,491,968 | B2 * | 7/2013 | Oki | 427/372.2 |
| 2002/0031608 | A1 * | 3/2002 | Aoki | 427/377 |
| 2003/0131793 | A1 * | 7/2003 | Endo et al. | 118/718 |
| 2011/0059266 | A1 * | 3/2011 | Borrel | 427/542 |
| 2011/0217585 | A1 * | 9/2011 | Wang et al. | 429/145 |
| 2012/0082884 | A1 * | 4/2012 | Orilall et al. | 429/145 |
| 2013/0011608 | A1 * | 1/2013 | Wolk et al. | 428/141 |

FOREIGN PATENT DOCUMENTS

| | | | | |
|---|---|---|---|---|
| JP | 60-11715 A * | 1/1985 | F16C 13/00 |
| JP | 2000-157923 | 6/2000 | |
| JP | 2001-170547 | 6/2001 | |
| JP | 2001-314798 | 11/2001 | |
| WO | 99-02933 | 1/1999 | |

OTHER PUBLICATIONS

European Search Report—EP 04 00 7398—Sep. 15, 2010.

Extended European Search Report dated Jun. 3, 2013 by the European Patent Office in European Application No. 13001366.7, 6 pages.

Extended European Search Report dated Jun. 3, 2013 by the European Patent Office in European Application No. 13001367.5, 7 pages.

European Official Communication dated Jun. 28, 2012 in corresponding European Application No. 04007398.3.

European Office Action dated May 30, 2014 in corresponding European Application No. 13001366.7.

European Office Action dated May 30, 2014 in corresponding European Application No. 13001367.5.

* cited by examiner

DRYING METHOD AND DRYING APPARATUS FOR COATING LAYER

This application is a divisional application of co-pending application Ser. No. 10/809,501, filed on Mar. 26, 2004, which claims priority of JP 2003-084846 filed in Japan on Mar. 26, 2003 and of JP 2003-084847 filed in Japan on Mar. 26, 2003, the entire contents of which are hereby incorporated by reference.

BACKGROUND OF THE INVENTION

1. Field of the Invention

The present invention relates to a drying method and a drying apparatus for drying a coating layer, and particularly to a drying method and a drying apparatus for drying a coating layer on a continuous and wide coating surface of a web as a continuously running flexible substrate while at least one liquid composition is applied on the web so as to form the coating layer.

2. Description Related to the Prior Art

E. B. Gutoff & E. D. Cohen teaches in the publication "Coating and Drying Defects" (Wiley-Interscience, John Wiley & sons, Inc) some methods and apparatuses for drying a wet coating layer on a continuous and wide coating surface of a web as a continuously running flexible substrate while at least one liquid composition is applied onto the web so as to form the coating layer. In the method and apparatus for drying, an wind is blown from an air nozzle to dry a wet coating layer on a coating surface of the web while another non-coating surface of the web is supported by rollers, and otherwise an wind is blown from an air nozzle to both coated and non-coating surfaces of the web to float the web in the atmosphere and to simultaneously dry the coating layer on the web in a situation in which the web is not supported by the rollers. The latter one is a non-contact type. In order to efficiently use a space, Japanese Patent No. S48-042903 discloses another non-contact type of a method and an apparatus for drying the wet coating layer, in which a web is coiled on a surface of a cylindrical dryer and an air is blown through holes formed on a wall of the cylindrical dryer. Thus the dry is effectively performed.

Such method and apparatus for drying the wet coating layer with blowing the heated air is called a blow-drying method and a blow-drying apparatus in below. In the blow-drying method, the moisture of the wind is usually adjusted, and thereafter the wind is blown onto the coating surface so as to evaporate the solvent and to dry the coating layer on the coating surface. Although the blow-drying method is excellent in the drying efficiency, the wind is blown to the coating layer directly or through a porous plate, straightening plate, or the like, which causes the bad conditions for the coating layer. Accordingly, the thickness of the coating layer loses uniformity, and unevenness or mura is generated. Further, the convection of the wind makes the evaporation speed of the solvent from the coating layer on coating surface nonuniform. In this case, the coating surface of the web has the orange peel of the coating layer (Ozaki, Yuji "Coating Technology" Asakura-shoten, 1971, Page 293-294). Accordingly, it is hard to form the coating layer having the uniform thickness.

Especially when an organic solvent is contained in a coating solution, the unevenness is generated so much. The reason therefor is as follows: in the primal situation, the organic solvent is contained enough, and when the organic solvent evaporates in this situation, the coating layer has the temperature distribution and a surface tension distribution. In this case, the marangoni convection occurs to generate the unevenness in the coating layer. The generation of the unevenness is a considerable coating defect. Further, when the liquid crystal compounds are contained in the coating layer, it is hard to obtain the predetermined and uniform orientation by blowing the wind to the substrate.

In order to solve these problems, the Japanese Patent Laid-Open Publication No. 2001-170547 (Page 3-5, FIG. 1) teaches a drying method in which a drying apparatus is disposed just after the coating process. In this publication, the drying space in the drying apparatus is separated into plural chambers. In each chamber, a wind is blown in a widthwise from a side to another side of the web while the wind-velocity is controlled. Thus the generation of the unevenness is reduced. The Japanese Patent Laid-Open Publication No. H09-073016 (Page 5, FIG. 5) discloses a drying method in which wire-nettings are provided for the same purpose instead of separating the drying space of the drying apparatus.

Further, there are other drying methods. For example, the concentration of the coating solution becomes higher or the thickener is added to the coating solution to make the viscosity higher, so as to reduce the convection of the coating layer in blowing the wind just after the coating process. Otherwise, when the solvent having high boiling point is used, the leveling effect also reduces the generation of the unevenness when the convection of the coating layer occurs in the wind blown to the coating layer just after the coating process. However, as described in Japanese Patent Laid-Open Publication No. 2001-170547 (Page 3-5, FIG. 1), the above two methods are not adequate for the high speed coating, and increase the drying time, which causes the extremely low productivity.

In order to reduce the nonuniform dry of the coating layer on the coating surface in blowing the wind, Japanese Patent Laid-Open Publication No. 2000-157923 (Page 2-3, FIG. 1) teaches a drying method in which the wind velocity is controlled so as to be lower. Further, Great Britain Patent 1401041, and U.S. Pat. Nos. 5,168,639, 5,694,701 disclose a drying method in which no wind is blown. In the drying method of Great Britain Patent 1401041, the solvent in the coating layer evaporates without wind to perform the drying, and the generated vapor gas is recovered. In this drying method, an entrance and an exit of the substrate is provided in an upper side of a casing of the drying apparatus. In the casing, a non-coating surface of the substrate is heated to promote the evaporation of the solvent from the coating surface for performing the dry. Thus a solvent vapor is generated, and condensed with a condenser which is disposed in a side of the coating surface, so as to dry the coating layer. Further, in the drying method of U.S. Pat. No. 5,168,639, a drum is disposed above the horizontally running substrate so as to recover the solvent vapor. Further, U.S. Pat. No. 5,694,701 proposes a drying method as an improvement of a layout of U.S. Pat. No. 5,168,639.

When a drying apparatus which has a casing surrounding the web is provided just after the coating process of the coating layer, the unevenness is easily generated especially in early dry period while the content of the solvent in the coating layer is large. Therefore it is necessary to make the wind velocity lower in the early dry period as much as possible. Accordingly, it is preferable to prevent the disorder of the wind near to the coating surface, and to keep the concentration of the solvent vapor high in a side of the coating surface of the substrate. Usually, as the solvent vapor of the organic solvent is heavier than the atmosphere, almost of the generated solvent vapor spontaneously diffuses downwards. Accordingly, a method is known, in which an air is forcedly fed such that the solvent vapor of the solvent does not diffuse.

Great Britain Patent No. 1401041 teaches that when the coating surface is directed downwards, the downward diffusion of the solvent vapor is promoted, and it is hard to keep the concentration of the solvent vapor high near the coating layer. Therefore the evaporation is not made uniformly. Furthermore, this publication discloses a structure in which the feeding direction is almost the vertical direction. However, the substrate must be inversed for the structure of the disclosed invention, and the zone cannot be made longer.

In the U.S. Pat. Nos. 5,168,639 & 5,694,701, the coating surface of the substrate is directed upward, and the substrate is fed in a almost horizontal direction. In this case, the solvent vapor easily escapes in a widthwise direction of the web, which causes the generation of the unevenness.

Otherwise, in GB Patent No. 1401041, a medium having a high temperature, such as a hot water, is used for heating the non-coating surface of the substrate. Thereby as the medium of the high temperature contacts to or is closed to the substrate, the coating surface of the substrate becomes extremely high, which is preferable in view of promotion of drying. Actually, however, when the temperature of the surfaces becomes too high, the solvent evaporates at a high speed. In this case, the coating layer is often not uniformly dried, or the high temperature decreases the viscosity of the coating layer on the substrate such that the streaming of the solution occurs in the coating layer. Otherwise, when the heating means is not used, the temperature of the coating layer becomes lower by the evaporation of the solvent. Accordingly, the drying speed becomes extremely lower, and plashing occurs in the latter half of the dryer.

The publications of the prior arts disclose the methods of recovering the solvent, but do not teach any concrete methods of reducing the generation of the unevenness just after the drying.

SUMMARY OF THE INVENTION

An object of the present invention is to provide a drying method and a drying apparatus for a coating layer on a coating surface of a substrate effectively and with reducing the generation of the unevenness, while at least one liquid composition is cast to form the coating layer on the substrate.

In order to achieve the object and the other object, a drying method for drying a coating layer which is formed by coating a moving web with a coating solution, the web is transported almost vertically and upward immediately after the coating. The transporting direction of the web is inclined with one or larger number of guide rollers from an almost vertical direction toward a horizontal direction gradually. Then the coating layer is dried with a drying device having a casing which surrounds the web just after the coating while disturbance of wind close to a coating surface is prevented and concentration of the solvent vapor in a side of a surface of the coating layer is kept high.

A drying apparatus for drying a coating layer of the present invention includes one or more number of guide rollers for gradually including the upwardly transported web just after the coating from an almost vertical direction toward a horizontal direction. Further the drying apparatus has a casing for surrounding the web just after the coating, such that disturbance of wind close to a coating surface may be prevented, and a concentration of the solvent vapor in a side of a surface of the coating layer may be kept high.

In a preferable embodiment of the present invention, the web surrounded by a casing at a transporting position is dried just after the coating with a drying device, so as to prevent disturbance of wind closed to a coating surface. Then the heating is made with a heating means, such that a temperature difference |T2−T1| between a temperature T1 of the coating layer at an entrance of the drying device and a temperature T2 of the coating layer at an exit of the drying device at most 5° C.

A preferable embodiment of a drying apparatus of the present invention included a drying device and a heating means. The drying device is disposed at a transporting position just after the coating, while a casing surrounds the web so as to prevent disturbance of wind closed to a coating surface. The heating means is disposed within the drying device for controlling a temperature difference |T3−T2| at most 5° C. between a temperature T1 of the coating layer at an entrance of the drying device and a temperature T3 of the coating layer in the drying device.

In a further preferable embodiment of a drying apparatus of the present invention, the drying device is disposed at a transporting position just after the coating while a casing surrounds the web so as to prevent disturbance of wind closed to a coating surface. A heating means is disposed within the drying device for controlling a temperature difference |T2−T1| at most 5° C. between a temperature T1 of the coating layer an entrance of the drying device and a temperature T2 of the coating layer at an exit of the drying device.

According to the drying method and the drying apparatus for drying the coating layer in the present invention, the wide coating layer continuously formed on a coating surface of the substrate by casting the coating solution is uniformly and effectively dried since the generation of the unevenness just after the application of the coating layer is restrained. In the present invention, further, the layout of the coating and drying processes does not vary so much, and the physical properties and the sorts of the coating solution are not restricted. Accordingly, the coating solution can be prepared in several methods. Furthermore, the reduction of the energy used in the production and that of the cost is effectively made. Further, in the present invention the network structure of the polymer and the particles that is formed in drying the coating layer.

BRIEF DESCRIPTION OF THE DRAWINGS

The above objects and advantages of the present invention will become easily understood by one of ordinary skill in the art when the following detailed description would be read in connection with the accompanying drawings.

PREFERRED EMBODIMENTS OF THE INVENTION

In the present invention, it is preferable that a blow-drying apparatus is provided after a drying apparatus. In this case, when much solvent (especially organic solvent) remains in the solution cast on a web, the drying unevenness easily generated. Therefore, in the present invention, the coating solution contains preferably at least 50% by mass.

Further, the effect of the present invention is very effective, when the organic solvent is contained in the coating solution, otherwise when only one or more organic solvent is used as a solvent of the coating solution. Furthermore, the effect of the present invention is more effective, when the boiling point of the organic solvent is low.

Figure 1:
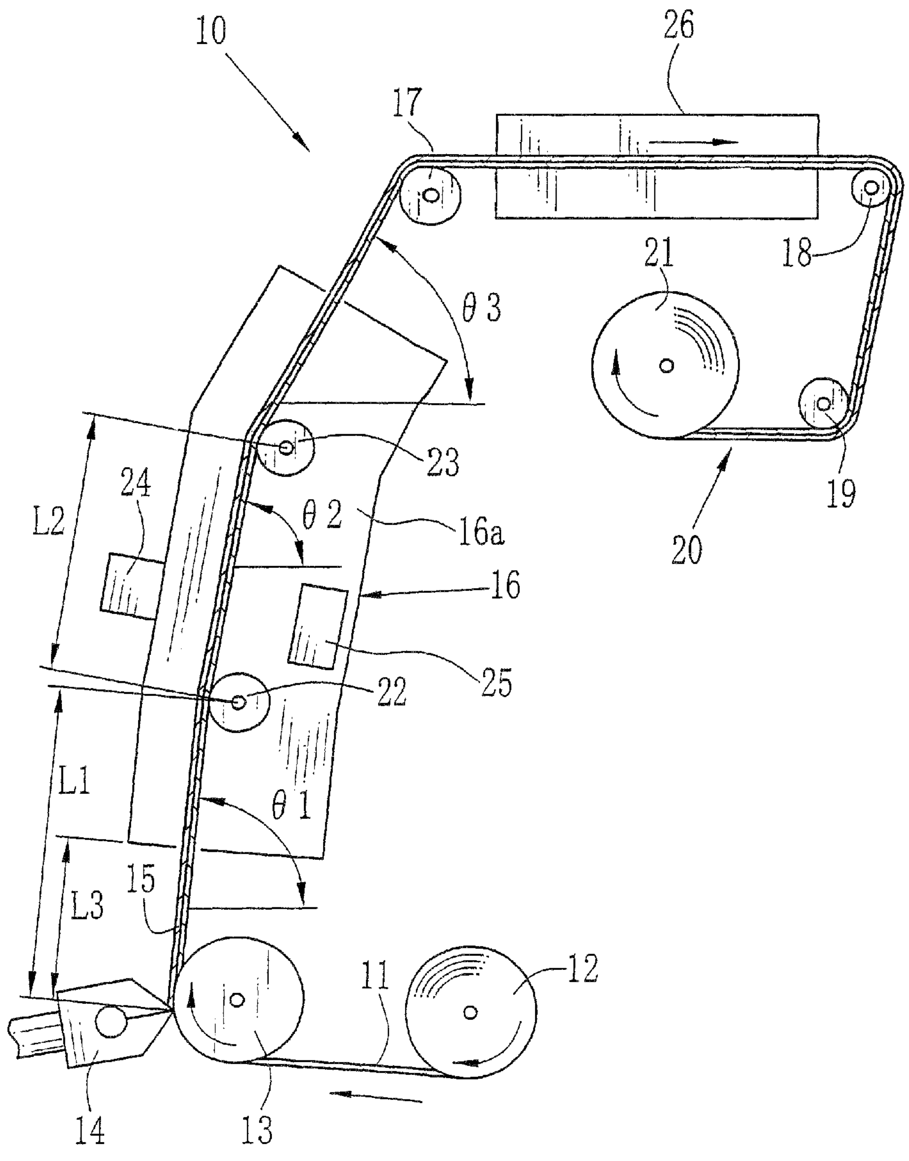
FIG. 1 is a schematic diagram of a first embodiment of a coating and drying line to which are applied a drying method and a drying apparatus for drying a coating layer of the present invention.

In FIG. 1, a coating/drying line 10 has a feeding apparatus 12, a back-up roller 13, an extrusion die 14, a drying apparatus 16, rollers 17-19, and a winding apparatus 21. The feeding apparatus 12 unwinds and feeds a web 11 wound in a web roll. The back-up roller 13 confront to the extrusion die 14, such that they construct a coating apparatus for coating the web 11 with a coating solution. The drying apparatus 16 dries a coating layer 15 formed of the coating solution cast on the web 11. The rollers 17-19 are arranged on a transport path in which the web 11 coated with the coating solution is transported. The winding apparatus 21 winds as a film product 20 produced through the coating and the drying. The drying apparatus 16 includes a first guide roller 22 and a second guide roller 23. The first and second guide rollers 22, 23 transport the web 11 with inclination at a transport angle (or an entrance angle) θ1 of the web to a horizontal direction in upstream from the roller 17, a transport angle θ2 of the web to a horizontal direction between the rollers 17 and 18, and a transport angle (or an exit angle) θ3 of the web to a horizontal direction between the rollers 18 and 19. A wind meter 24 is provided for the drying apparatus 16, and measures the wind velocity of a wind blown in the drying apparatus 16. Preferably, the drying apparatus is tightly-closed such that the wind velocity is at most 0.1 m/s when the web 11 is not transported in the drying apparatus 16. Further, the drying apparatus 16 has a box-shaped heater 25 so as to have a predetermined temperature. In order to moreover dry the web 11 fed out from the drying apparatus 16, a blow-drying apparatus 26 is disposed in the coating/drying line 10. Note that the number of the guide roller is not restricted in the figure, and may be one or more.

As materials of the web 11, there are polymer film (formed of PE (polyethylene), PET (polyethylenetelephthalate), TAC (cellulose triacetate) and the like), paper, gold foil and the like. The coating solution contains, for example, a discotic liquid crystal in order to produce an optical compensation sheet, otherwise a silver halide particles used for heat developing photosensitive material, and the like. However, the coating solution is not restricted in them. Furthermore, the composition of the organic solvent in the coating solution is at least 50 wt. %.

The organic solvent means an organic liquid compound with dissolubility of material. As the organic solvent, there are aromatic hydrocarbons (toluene, xylene, styrene and the like), aromatic hydrocarbon chloride (chlorobenzene, o-dichlorobenzene, and the like), derivatives of methane (monochloromethane and the like), aliphatic hydrocarbon chloride including derivatives of ethane (monochloroethane and the like), alcohols (methanol, isoproryl alcohol, isobutyl alcohol and the like), esters (methyl acetate, ethyl acetate and the like), ethers (ethylether, 1,4-dioxane and the like), ketones (acetone, methylethylketone and the like), glycolether (ethyleneglycol monomethylether and the like), alycyclic hydrocarbon (cyclohexane and the like), aliphatic hydrocarbon (n-hexane and the like), and the like. Further they are optionally mixed to use in the present invention.

In the coating apparatus, the other than the extrusion die 14 in FIG. 1 may be used. For example, there are a slot-die coater, a wire bar coater, a roll coater, a gravure coater, a slide coater, curtain coater, and the like. Note that when the coating is made, the surface to be coated may be directed upward or downward, and otherwise inclined to the horizontal direction.

A dust removing apparatus (not shown) may be provided before and after the coating apparatus. The surface of the web 11 may be pretreatment. An optical film preferably have high quality, for example does almost not have dust. Accordingly, when both of the provide of the dust removing apparatus and the previous processing are simultaneously adopted, then the coating and the drying of the coating layer is made with high quality.

The positional relation between the back-up roller and the first or second guide roller 22, 23 is determined such that the transport angle between the web transporting direction and the horizontal direction may be gradually smaller. preferably, the first guide roller 22 is disposed such that the web 11 may be transported almost perpendicularly after the back-up roller 13. Especially, as the guide rollers 22, 23 are disposed in the drying apparatus 16, the transport angles θ1 at an entrance, θ2 in a casing **16*a*, and θ3 at an exit of the drying apparatus 16** satisfy following conditions;

$$60° \le \theta 3 \le \theta 2 \le \theta 1 \le 90°,\ \theta 3 < \theta 1.$$

Namely, it is preferable in the present invention, the transporting direction is directed upward at in the range of 60°-90°, and the coating surface is disposed in upper side. The transporting direction is particularly preferably 75°-89°, especially preferably 75°-88°. When the transporting direction is less than 60°, then a speed at which the solvent vapor flows down in the effect of the gravity becomes smaller, and the solvent vapor easily escapes from the side of the coating layer. Therefore it is difficult to keep the concentration of the solvent vapor close to the coating layer high. Further, when the solvent vapor easily escapes from the side of the coating layer, the uniform concentration of the solvent vapor is lost, which causes the drying unevenness. In order to prevent the disorder of the wind and to keep the concentration of the solvent vapor high near the coating surface, the velocity of wind in the drying apparatus is at most 0.1 m/s in the situation that the web is not transported.

In this embodiment of the present invention, in order to keep the constant transport speed and reduce the extraordinary transport, the distance L1 between the coating position and the first guide roller 22 is preferably at most 2 m, and the distance L2 between the first guide rollers 22 and 23 is preferably at most 2 m. Note that the number of the guide roller in the drying apparatus 16 is not restricted in two, but may be larger. In this case, the distance between the neighboring guide rollers is at most 2 m. Further, only one guide roller may be used in the present invention.

The natural convection occurs in the coating solution in the coating layer 15 just after the coating on the web 11, and thus the unevenness is formed in the coating layer 15. In order to prevent the formation of the unevenness, it is preferable to dispose the drying apparatus 16 closed to the coating apparatus. The casing **16*a* of the drying apparatus 16 surrounds a transport path of the web 11 after the application of the coating solution so as to prevent the disorder of the flow of the wind near to the coating surface of the web 11. Furthermore, high concentration of a solvent vapor of the organic solvent is kept in an atmosphere in a side of the coating surface while the coating layer 15 is dried. Accordingly, the evaporation is not made suddenly, and the deformation of the web 11 and the coating layer 15 is prevented. Concretely a distance L3 between the coating apparatus and an entrance of the drying apparatus 16 is preferably at most 2 m, and especially at most 0.7 m. In the drying apparatus 16 the drying of the coating layer 15 is promoted, and thereafter the roller 17 supports the web 11 and feeds it into the blow-drying apparatus 26. Note that the roller 17** may be a free roller, or a drive roller to which a driving device (not shown) is attached.

In the drying apparatus 16, since plural guide rollers 22, 23 are disposed, the length of the casing 16*a* can be determined independent of the transport conditions. When the temperature of the guide rollers 22, 23 becomes higher with use of the heater 25, it is preferable that a jacket is attached to each guide roller 22, 23 so as to obtain a jacket roller for controlling the temperature.

In the blow-drying apparatus 26, the coating layer 15 is further dried, and thus the film product 20 is obtained from the web 15. As the blow-drying apparatus 26, the dryer of the prior art, such as a roller transport type, a floating type, a coil-type, and the like. In the dryer of the roller transport type, the non-coating surface is supported by rollers, and a wind is blown from a air nozzle to the coating surface. In the dryer of the floating type, a wind is blown from a air nozzle to both coated and non-coating surfaces of the web to float the web in the atmosphere and to simultaneously dry the coating layer on the web in a situation in which the web is not supported by the rollers. In the dryer of the coil type, a coil type drying apparatus is used so as to use a space effectively and make the drying effectively. In these dryers, there is a common point that the dry wind is supplied to the coating surface of the web 11.

Thereafter, the film product 20 is supported with rollers 18, 19 and wound with the winding apparatus 21. Note that the roller 18, 19 may be also the free roller or the drive roller as the roller 17.

Figure 2A:
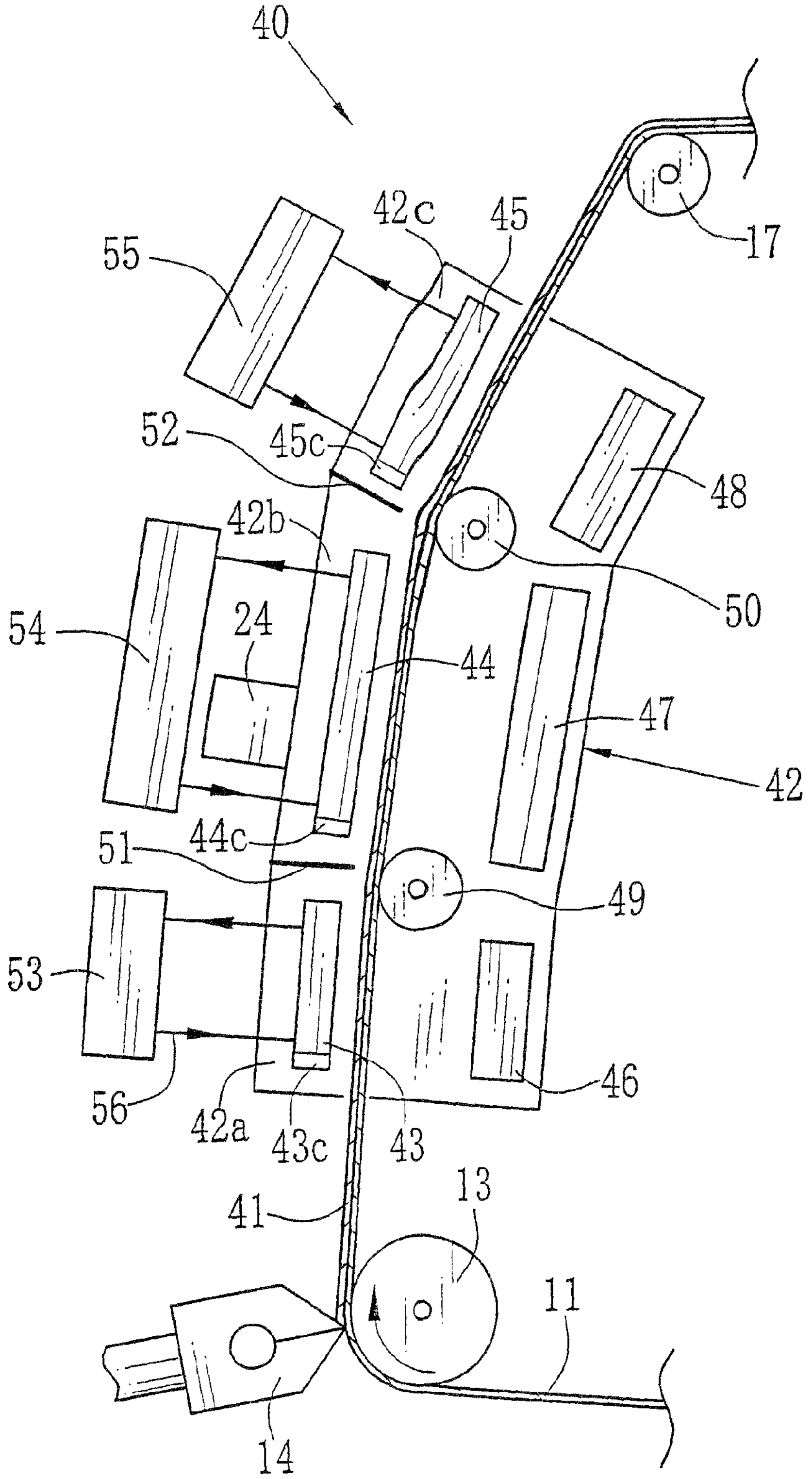
FIG. 2A is a schematic diagram of a second embodiment of a coating and drying line to which are applied a drying method and a drying apparatus for drying a coating layer of the present invention.

In FIG. 2A, the extrusion die 14 casts a coating solution to form a coating layer 41 on the web 11. A drying apparatus 42 includes condensers 43-45 and box-shaped heaters 46-48 in another side from the web 11. Further, a side of the coating layer 41 is separated with a partation plates 51, 52 to form a first space 42*a* between a first guide roller 49 and a entrance of the drying apparatus 42, a second space 42*b* between a second guide roller 50 and the first guide roller 49, and a third space 42*c* between an exit of the drying apparatus 42 and the second guide roller 50. The first-third spaces 42*a*-42*c* are respectively provided with the condensers 43-45.

The heaters 46-48 simultaneously promote to evaporate from the coating layer a solvent containing the organic solvent under control. The heaters 46-48 are disposed in a side of the non-coating surface of the web 11 and respectively opposite to the condensers 43-45. Further, a feed roller (heating roller) whose temperature is made higher may also be provided in the heating apparatus 40. Furthermore an infrared ray heater and a microwave heating means may be used to heat the web 11. The infrared ray heater is preferably radiates low infrared ray, and has, for example, a box-like shape whose surface is flat and jackets in which a how water flows. In this case, the setting distance between the web 11 and the infrared ray heater and the temperature are regulated accurately. Accordingly, a drying temperature for drying the coating layer can be controlled precisely.

The condensers 43-45 are disposed with a predetermined distance from the web 11, and have plate shapes so as to be parallel to the feeding direction of the web 11. Coolers 53-55 of a heat exchanger type are respectively connected to and feed cooling medium 56 into the condensers 43-45. The condensers 43-45 condense and recover the evaporated organic solvent. The materials used for the condensers 43-45 may be metal, plastics, wood and the like. However, they are not restricted especially. When the organic solvent is contained in the coating solution, it is preferable to use the material having a resistance to the organic solvent or to make the coating on the surface of the condenser.

In the present invention, in order to dry the coating layer without the generation of the dry nonuniformity, the regulation of the temperatures of each condenser 43-45 is preferably made. Thus the drying speed of the coating layer 41 is controlled.

Figure 3:
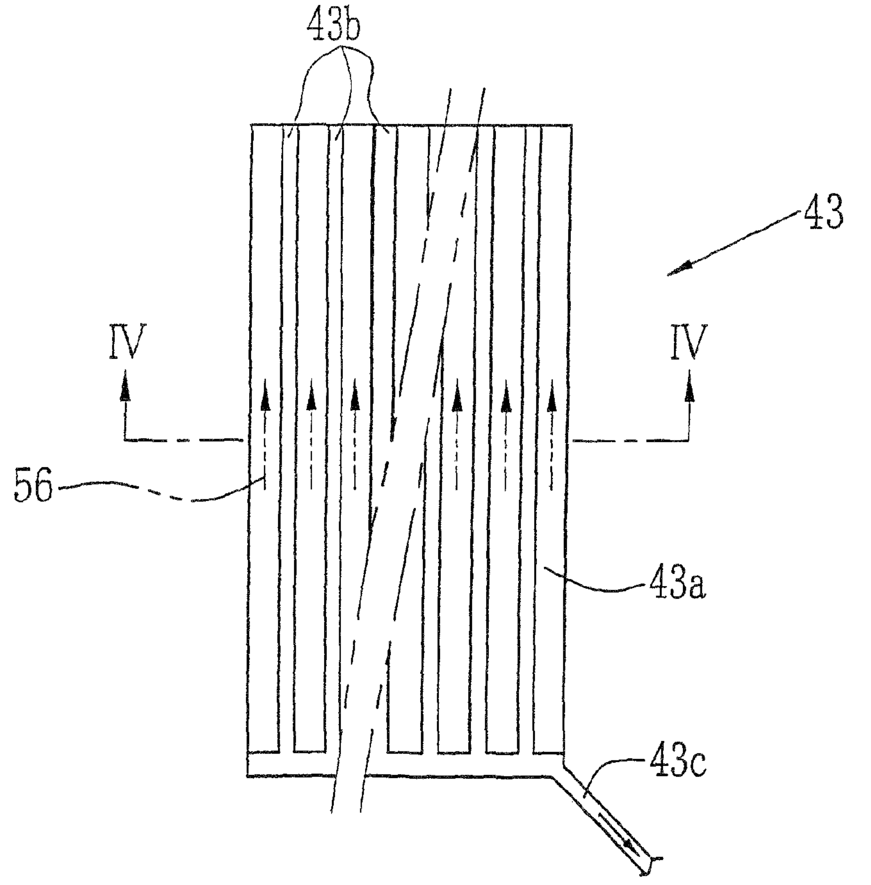
FIG. 3 is a figure illustrating a condenser used in the method of the present invention.

As shown in FIG. 3, on a condensing surface of the condenser 43 are formed protrusions 43*a* and grooves 43*b* so as to extend in a lengthwise direction, and the condenser 43 is disposed such that the lengthwise direction may be the transporting direction. Accordingly, in the effect of the gravity, the condensed solvent flows downwards in the grooves 43*b*. The condenser 43 has a gutter 43*c* in lower and right side of this figure for recovering the organic solvent. Preferably, the condenser 43 has a form or a structure not so as to generate the unnecessary forces against the gravity for the condensed solvent flowing down. For example, when the groove 43*b* forms a deep groove, or a narrow groove in which the capillary force is generated effectively against the gravity, it is not preferable to the present invention. Note that the condenser may have a structure so as to have the same functions as described above. The condenser may be, for example, porous plates, a net, a duckboard, a roller and the like. Further, a recovering device disclosed in U.S. Pat. No. 5,694,701 may be used simultaneously.

Figure 2B:
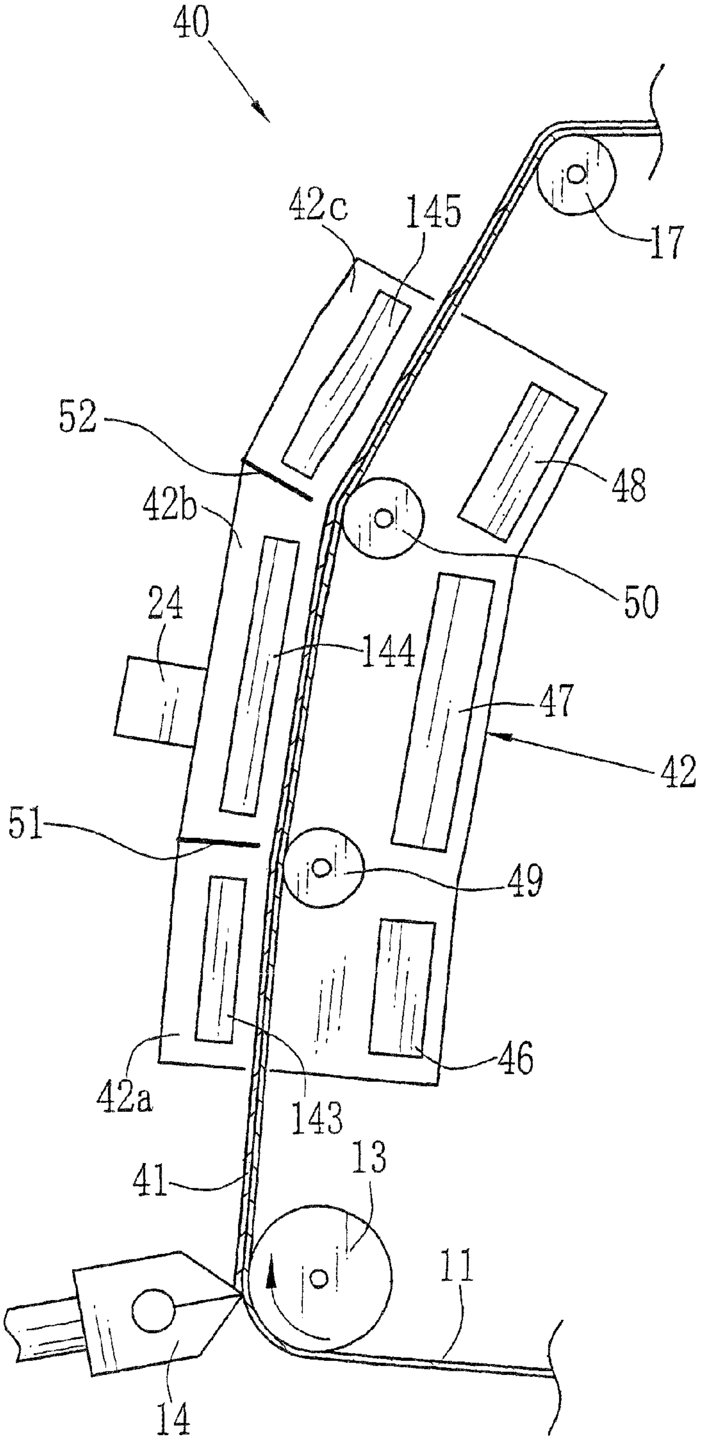
FIG. 2B is a schematic diagram of a third embodiment of a coating and drying line to which are applied a drying method and a drying apparatus for drying a coating layer of the present invention.

In FIG. 2A, the condensers 43-45 are used, However, as shown in FIG. 2B, instead of the condensers 43-45, a flow straightening plate 143-145 may be disposed parallel to the transporting direction. In this case, the coolers 53-55 in FIG. 2A are not provided. Further the flow straightening plates 143-145 are made of metal, plastic, woods and the like.

Figure 4:
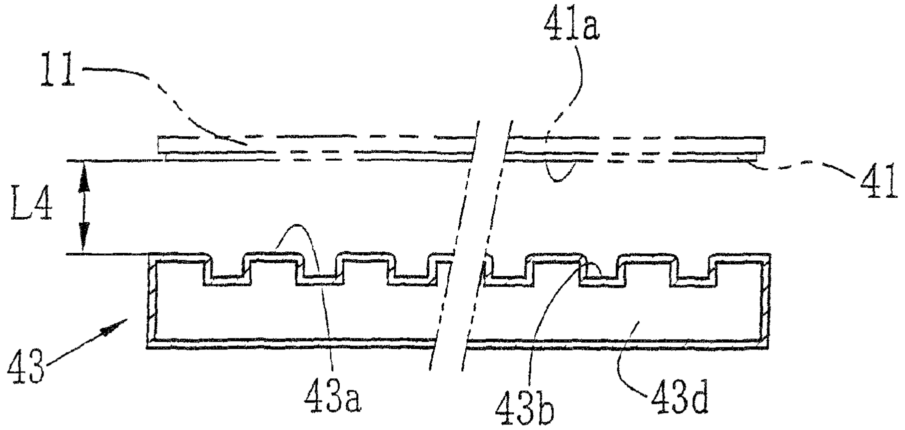
FIG. 4 is a sectional view of a condenser along a line IV-IV.

In FIG. 4, a distance L4 between a surface 41*a* of the coating layer 41 and the protrusion 43*a* is adequately determined in consideration with the predetermined drying speed of the coating layer 41. When the distance L4 is shorter, then the drying speed becomes not only higher, but also the difference of the distance L4 from the predetermined value has large influence on the drying speed. Further in this case, the provability of the contact of the surface 41*a* to the protrusion 43*a* becomes larger. Otherwise, when the distance L4 is large, the drying speed does not become only much lower, but the thermal energy causes the natural convection of the coating solution to form the drying nonuniformity. Accordingly, the distance L4 is preferably in the range of 5 mm to 10 mm. Note that the condenser 43 has a flow space 43*d* (see FIG. 4) in which the cooling medium 56 flows, and therefore the temperature is easily controlled so as to effectively recover the solvent. Further, as the cooler 53-55 for regulating the temperature of the cooling medium 56, there are in which a cooling medium (such as water) is used, an air cooling type in which air is used, electric types in which such as a peltier element is used, and the like.

The drying apparatus may have side plates instead of the casing. Thus it is prevented that the solvent vapor of the organic solvent diffuses from the area near to the coating surface of the web. Note that the present invention is not especially restricted when a side of the drying apparatus is tightly closed.

The web 11 is preferably transported at the transport speed at which the web 11 reaches the drying apparatus in three seconds from the application of the coating solution on the web 11. When the coating amount of the coating solution and the thickness of the coating layer are large, then the convection usually occurs easily, and therefore the unevenness is formed. However, in the present invention, even when the coating amount of the coating solution and the thickness of the coating layer are large, the enough effect is obtained. Especially when the thickness of the wet coating layer is 0.001 mm to 0.05 mm (1 μm to 50 μm), the coating layer can be dried without generation of the unevenness. Note that the thickness determined as the total thickness of the coating layer formed on the web by coating the coating solution.

As the unevenness in the coating layer is easily formed especially in early dry period during which much solvent remains in the coating layer, it is preferable that at least 70% by mass of the solvent in the coating solution is evaporated, and condensed or reduced in the drying apparatus 16. In this case, the remaining solvent in the coating solution is evaporated in the blow-drying apparatus 26. What percentage by mass of the solvent is evaporated, it is determined in total consideration of the influence on reducing the generation of the drying nonuniformity in the coating layer, the productivity, and the like. Further, when the transport speed is too high, then the atmosphere closed to the web 11 is moved to be an unexpected wind, and the unexpected wind has a bad influence on the coating layer 15 on the web 11. Accordingly the transport speed of the web 11 is from 1 m/min to 100 m/min.

In the present invention, in order to promote the evaporation of the organic solvent in the coating layer 15 and the condensation thereof, the web 11 is cooled in the side of the coating layer by the condensers 43-45, and heated in another side by heaters 46-48. In this case, it is very important that the temperatures of the web 11, the coating layer 15 and the condensers 43-45 are determined that the solvent vapor is not condensed on other parts than the condensers, for example, on surfaces of the guide roller 22, 23. In order to prevent such unexpected condensation, the temperatures of the other parts are set to be higher than those of the condensers. Especially, as the cooled organic solvent flows in the gutters 43*c*, 44*c*, 45*c*, the temperatures of the gutters 43*c*-45*c* become lower. Accordingly, a device or a member for thermo-insulating is provided for preventing the condensation on the gutters, and may be, for example, a device of heat-exchanging type in which water is used, a thermal insulator and the like.

While the coating/drying line has the drying apparatus in which the drying method of the present invention is applied, the feeding apparatus, the guide rollers, the winding apparatus and the like that are provided in the coating/drying line are constructed of members which are usually used. The explanation of them is omitted.

According to the above described embodiments of the drying method and the drying apparatus of the present invention, the generation of the unevenness in the coating layer 15 just after the coating is prevented, and the uniform drying of the coating layer is made. Further, the layout of the drying processes is not changed too much in the present invention. Furthermore, as there is no restriction in the physical property of the coating layer and the sorts of the solvents, the preparation of the coating solution is flexibly designed.

The above embodiments which has a structure for condensing and recovering the solvent vapor is preferably used in the present invention. However, while the blow-drying apparatus already known is used in the coating/drying line, the drying apparatus of the present invention is disposed between the coating apparatus and the blow-drying apparatus. In the drying apparatus, the casing is provided to surround the web just after the coating, such that the unexpected wind closed to the coating surface of is not generated there and the concentration of the solvent vapor is high in the side of the coating surface. In this structure, the effect of the present invention is obtained, and therefore the improvement of the casting/drying line is made at low cost.

In the drying method and the drying apparatus of the present invention, the coating layer is uniformly dried, especially in the early dry period. Not only the effect above explained but also another effect is obtained unexpectedly as follows: while the coating layer is dried, a network structure of the polymers and particles in the coating layer is formed, and in the present invention the network is a narrow band network formed uniformly. Thus, as the coating layer is uniformly dried and has a structure of narrow band network, the film product 20 used for an optical film is supplied with new additional functions. Further, the drying apparatus of the coating layer of the present invention is used extremely adequately, for example, for drying the functional layer containing nanoparticles.

The drying method and the drying apparatus of the present invention has the same effects when the coating solution is a solution or a dispersion of solid materials (for example the polymer or particle). When the particles are used as the solid material for the coating solution, the generation of the unevenness has a large influence on the dispersion state. Accordingly the present invention is applied to this case.

The present invention is adequately applied to the production of an optical function sheet (optical compensation sheet and the like), a prime layer formed of a photosensitive material, a heat-developable photosensitive material (or a photo film), a functional film containing micro particles (such as nanoparticles), a prime layer formed from a solvent of the film which is used as the photosensitive material, a photo film, a photographic paper, magnetic recording tape, adhesive tape, pressure sensitive paper, off-set plate material, battery, and the like.

Figure 5:
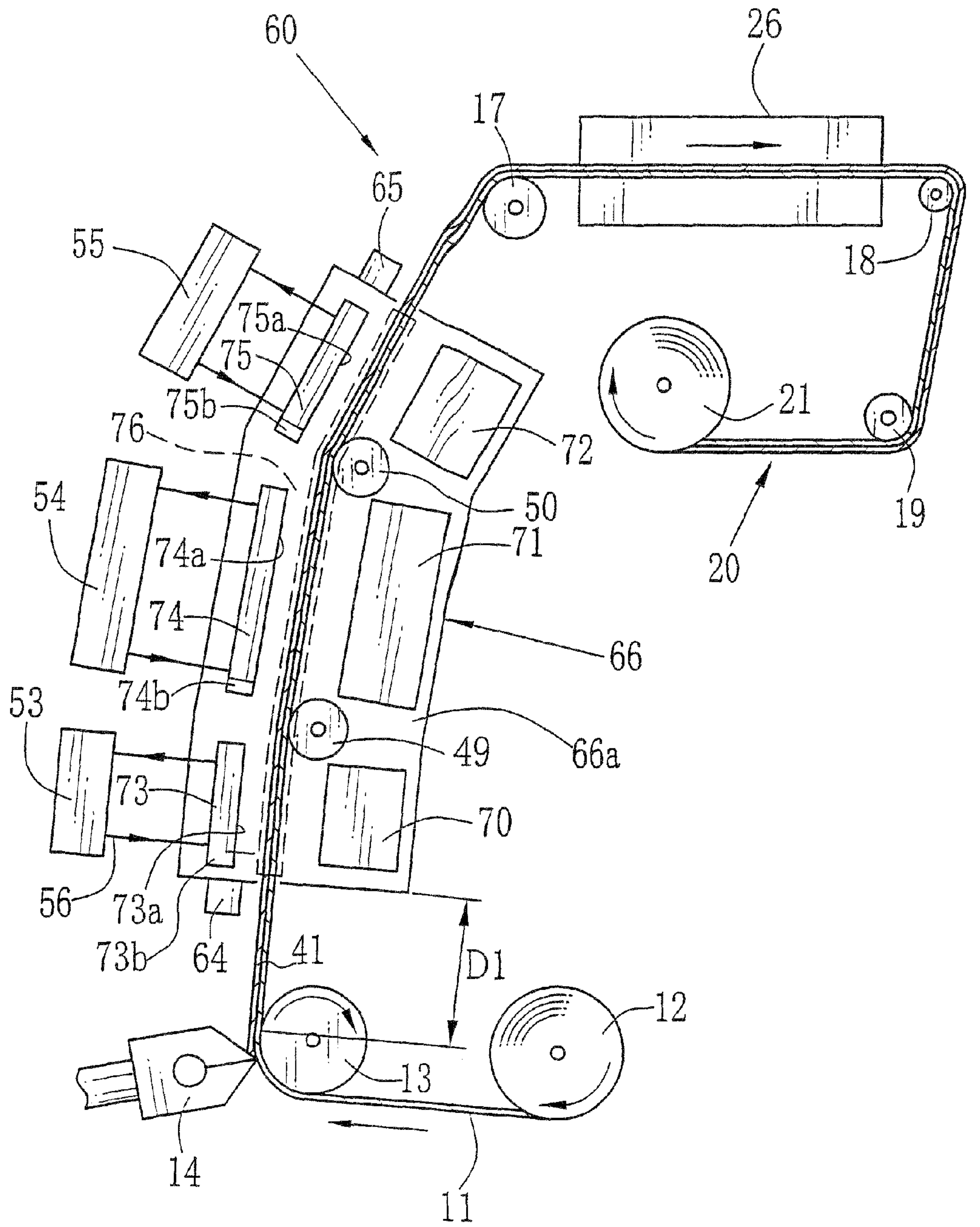
FIG. 5 is a schematic diagram of a fourth embodiment of a coating and drying line to which are applied a drying method and a drying apparatus for drying a coating layer of the present invention.

In FIG. 5, a coating/drying line 60 is provided with a drying apparatus 66. The same members and parts have the same numbers as in FIG. 2, and the explanation thereof is omitted. Note that in the present invention, the blow-drying apparatus can be used as the heat-ripening means.

The drying apparatus 66 includes box-shaped heaters 70-72, and thermometers 64, 65 are respectively attached to an entrance and an exit for measuring an entrance temperature T1 and an exit temperature T2 of the coating layer 15 on the web 11. Further, a thermosensor 76 is provided in the drying apparatus 66 for measuring the drying temperature T3 at the optional position of the coating layer 15 in the casing 66*a*. Note that the thermometers 64, 65 and the thermosensor 76 used in the coating/drying line 60 may be already known.

The heaters 70-72 heat the web 11 to evaporate the solvent contained in the coating layer 15. In order to recover a solvent vapor of the organic solvent, condensers 73-75 disposed with a predetermined distance from the web 11 so as to be nearly parallel to the feeding direction of the web 11. It is to be noted in the present invention that the condenser may have a function of a baffle plate and the like. The materials used for the condenser or the plate member may be metal, plastics, wood and the like. However, they are not restricted especially.

When the organic solvent is contained in the coating solution, the used material preferably have a resistance to the organic solvent or a character of making the coating on the surface of the plate member.

In order to dry the coating layer 15 without generation of the unevenness, it is necessary to control the drying speed of the coating layer 15. In this embodiment, the control is made by regulating the temperature of the condensers 73-75. Coolers 53-55 are combined to the condensers 73-75, and may be, for example, a heat exchanger type for cyclically feeding a cooling medium 56, an air cooling type in which air is used, electric types in which such as a peltier element is used, and the like.

As described above, the drying speed of the coating layer 15 is regulated, and therefore the condensing speed in condensing the solvent vapor is controlled. Accordingly, during the dry of the coating layer, the concentration of the solvent vapor in the atmosphere between the coating layer 15 and the condenser 73-75 can be easily kept to be high. In this situation, the drying of the coating layer 15 is not suddenly made, and therefore the deformation of the coating layer and the web, (or the generation of the unevenness) is prevented. Instead of the condensers, the drying apparatus may be provided with parts which have the same functions, for example, porous plates, a net, a duckboard, a roller and the like. Further, a recovering device disclosed in U.S. Pat. No. 5,694,701 may be used simultaneously.

In order to recover the solvent condensed by the condensers 73-75, it is preferable, for example, that the condensing surfaces 73*a*-75*a* are provided with protrusions and recesses (not shown) so as to form grooves (not shown) extending in web transporting direction. The condensed solvent flows in the grooves and therefore the recovery of the condensed solvent is made smoothly. Further, in the lower and right sides, the condensers 73-75 are provided with gutters 73*b*-75*b* so as to remove the condensed solvent from the condensing surfaces 73*a*-75*a* of the condensers 73-75.

It is very important that when the temperatures of the web 11, the coating layer 15 and the condensers 73-75 are determined than the solvent vapor is not condensed on other parts than the condensers, for example, on surfaces of the guide rollers 49, 50. In order to prevent such unexpected condensation, for example, the temperatures of the other parts are set to be higher than those of the condensers.

The drying apparatus 66 has the casing 66*a* which surrounds the web and tightly closes the inside except the entrance and the exit such that the atmosphere in or out of the casing 66*a* is not fed out or sucked in the drying apparatus 66. Further, just after the application of the coating solution, the generation of the unevenness in the natural convection of the coating layer is prevented. In the purpose thereof, the drying apparatus is disposed just after the coating process. Concretely, the distance D1 between the coating position and the entrance of the drying apparatus 66 is preferably at most 2 m, and especially preferably at most 0.7 m.

For the same reason, the web 11 is preferably transported at the transport speed at which the web 11 reaches the drying apparatus 66 in three seconds from the application of the coating solution on the web 11. When the coating amount of the coating solution and the thickness of the coating layer are large, then the convection usually occurs easily, and therefore the unevenness is formed. However, in the present invention, even when the coating amount of the coating solution and the thickness of the coating layer are large, the enough effect is obtained. Especially when the thickness of the wet coating layer is 0.001 mm to 0.05 mm (1 μm to 50 μm), the coating layer can be dried without generation of the unevenness. Note that the thickness determined as the total thickness of the coating layer formed on the web by coating the coating solution.

When the transport speed is too high, then the atmosphere closed to the web 11 is moved to be an unexpected wind, and the unexpected wind has a bad influence on the coating layer 15 on the web 11. Accordingly the transport speed of the web 11 is from 1 m/min to 100 m/min. As the unevenness in the coating layer is easily formed especially in early dry period in which the content of the solvent in the coating layer is large, it is preferable that at least 70% by mass of the solvent in the coating solution is evaporated, and condensed or reduced in the drying apparatus 66. In this case, the remaining solvent in the coating solution is evaporated in the blow-drying apparatus 26. What percentage by mass of the solvent is evaporated, it is determined in total consideration of the influence on the coating layer for the generation of the unevenness, the productivity, and the like.

The entrance temperature T1 at the entrance of the drying apparatus 66 and the exit temperature T2 of the coating layer 15 at the exit are respectively controlled such that the difference ($|T2-T1|$) between the exit and the entrance is at most 5° C. Thus the organic solvent from the coating layer 15 is not suddenly evaporated, and the generation of the unevenness is reduced. Preferably, while the drying temperature of the coating layer 15 in the casing 66*a* of drying apparatus 66 is determined as the drying temperature T3, the difference ($|T3-T1|$) between the inside and the entrance of the drying apparatus 66 is at most 5° C. Thus the generation of the unevenness is further reduced. Accordingly, it is preferable that the control of the temperatures at the entrance, the inside and the exit are independently made between the heaters 70-72. Further, the shape and the number of the heaters provided for the drying apparatus 66 is not restricted in the figure. For example, the three heaters are separately provided in the figure. However, only one heater may be provided in the drying apparatus. In this case, the temperatures are controlled at plural parts of the one dryer. The control of each temperature is made on the basis of the data monitored by the thermometers 64, 65 at the entrance and the exit, and the thermosensor 76. Note that a straitening plate may be provided instead of the condensers similar to the structure in FIG. 2B.

Figure 6:
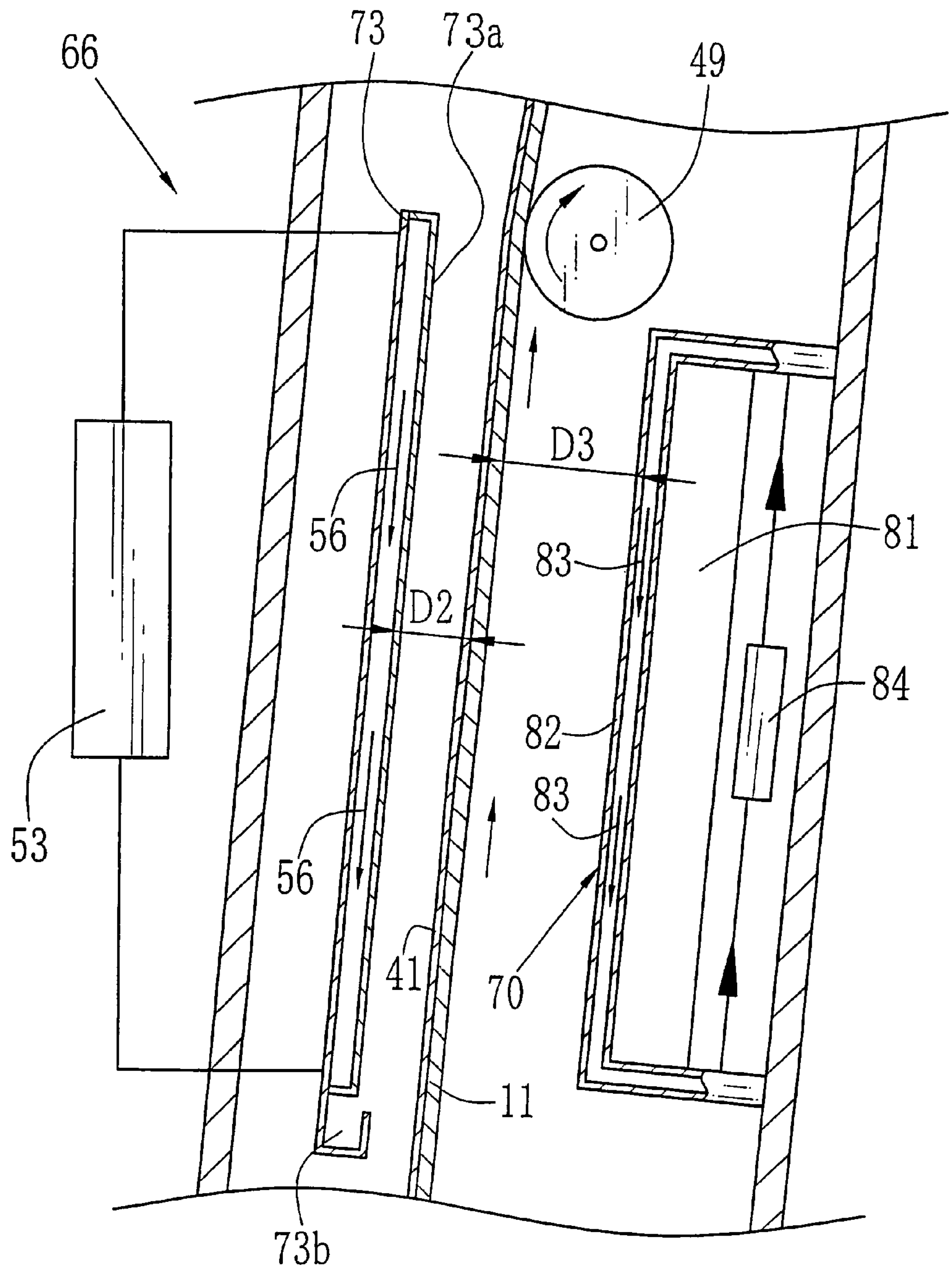
FIG. 6 is a partial sectional view of the drying apparatus in FIG. 5.

In FIG. 6, in order to condense the solvent vapor, it is preferable that the cooler 53 cyclically feeds a cooling medium 56 to cool the condenser 73. A distance D2 between the condensing surface 73*a* and the coating surface of the web 11 is, in order to reduce the generation of the unevenness, set adequately in consideration of the predetermined drying speed of the coating layer 15. When the preset distance D2 is small, the drying speed becomes higher. However, the difference of the preset distance D2 from the predetermined value has large influence on the drying speed. In this case, the provability of the contact of the surface of the coating layer 15 to the condensing surface 73 becomes larger. Otherwise, when the preset distance D2 is large, the drying speed does not become only much lower, but the thermal energy causes the natural convection of the coating solution to form the unevenness. Accordingly, the preset distance D2 is preferably in the range of 5 mm to 10 mm. Note that it is preferable that the condensers 74, 75 have the same structure as the condenser 73.

As the heater 70, an infrared ray heater, and the like can be used. Preferably, the heater 70 is the infrared ray heater which irradiates low infrared ray in low energy range. In this case, the heater 70 includes a box-like shaped heater body 81 whose surface is flat and a jacket 82 covering the heater body 81. In the jacket 82, a heating medium (for example hot water)

83 is cyclically fed to heat the web 11 and the like. In this case, the preset distance D3 between the web 11 and the heater (or the infrared ray heater) 70 is adequately set, and the temperature of the heating medium 83 in the jacket 82 is accurately controlled by a temperature controller 84. Thus, the temperature for the coating layer in the drying can be controlled precisely. Concretely, it is preferable to set the distance D3 in the range of 10 mm to 50 mm, and the temperature of the heating medium 83 in the range of 40° C. to 80° C. However, the present invention is not restricted in them. Note that it is preferable that the other heaters 71, 72 have the same structure as the heater 70. Further, as the heating apparatus 40, a microwave heating means may be used to heat the web 11.

Figure 7:
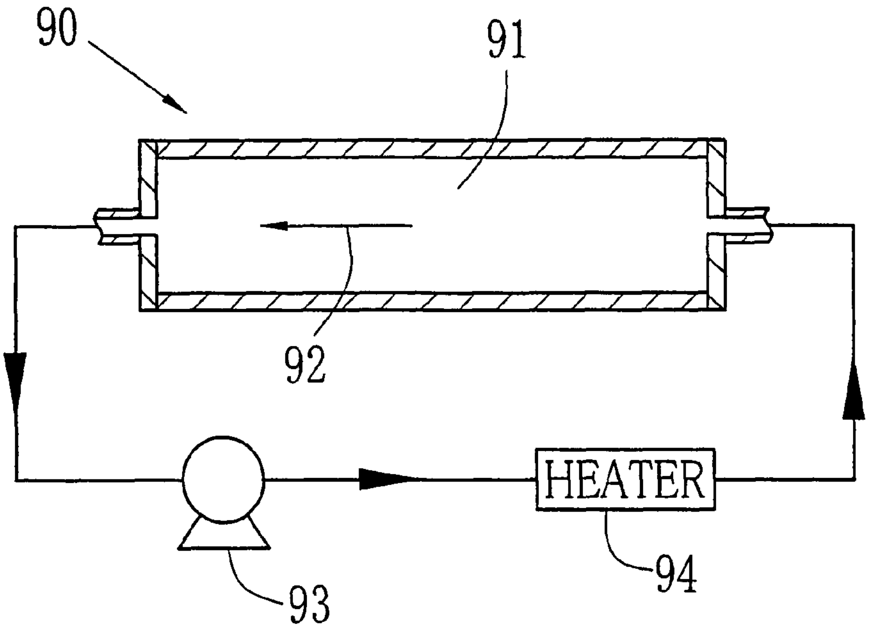
FIG. 7 is a sectional view of a heat roller used instead of guide roller in FIG. 5.

Heating rollers 90 in FIG. 7 may be used instead of the guide rollers 49, 50 (in FIG. 5). The temperature of the heating rollers 90 can be controlled so as to be higher, and thus the drying of the coating layer 15 is made. The heating roller 90 has a medium chamber 91, and is connected through a pump 93 to a heater 94. The heater 94 supplies a thermal energy to a heating medium 92 so as to regulate the temperature of the heating medium 92 to the predetermined value. When the pump 93 is driven, then a heating medium is cyclically fed between the heater 94 and the medium chamber 91 of the heating roller 90.

As shown in FIG. 5, since plural guide rollers 49, 50 are disposed in the drying apparatus 66, the length of the casing 66*a* can be determined independent from the restriction of the transport. When the guide rollers 49, 50 are heated with the heaters 70-72 to have the higher temperature, it is preferable that a jacket is used as each guide roller 49, 50, so as to control the temperature.

In the present invention, the drying apparatus is not restricted in the above description. While the coating/drying line has the drying apparatus in which the drying method of the present invention is applied, the feeding apparatus, the guide rollers, the winding apparatus and the like that are provided in the coating/drying line are constructed of members which are usually used. However, the explanations of them are omitted.

EXAMINATION

Experiment 1

In Experiment 1, the optical compensation film is produced in the film production line. In the drying process of the coating layer in the film production line, the drying apparatus of FIG. 2 that has the casing to surround the web after coating is disposed, so as to prevent the unexpected flow of air near to the coating layer. And the estimations of the optical compensation films as film products are made while the angle between the web transporting direction at the entrance and at the exit is varied.

Processes for producing the optical compensation film in the film production line are as follows:

1) feeding process of a transparent film as the web;
2) forming process of a polymer layer used for an orientation layer by coating and drying a coating solution on a surface of the transparent film with use of the drying apparatus of the present invention;
3) rubbing process of rubbing the surface of the polymer layer to form the orientation layer on the transparent film;
4) coating process of coating the orientation layer with a coating solution containing the discotic liquid crystal compound, to form a coating layer;
5) drying process for drying the coating layer by evaporating the solvent in the coating layer;
6) forming process of a liquid crystal layer having discotic-nematic phase by heating the coating layer at the temperature for forming discotic-nematic phase;
7) solidifying process of the liquid crystal layer (namely, by cooling very fast after forming the liquid crystal layer, or by cross-linking the liquid crystal layer in radiation of the light (or heating) when the discotic compound having a functional group which can make cross-linking) is used so as to obtain the optical compensation film;
8) winding process of the optical compensation film on which the orientation layer and the liquid crystal layer are formed.

In Example 1 of the film production method of the optical compensation sheet, the processing is sequentially carried out from the feeding process of the continuous transparent film to winding process of the obtained optical compensation sheet. A continuous film of Triacetyl cellulose (FUJI TAC, produced by Fuji Photo Film Co. Ltd.: Thickness=100 μm; Width=500 mm) is used as the transparent film. On a side of the continuous film, a 5 wt. % solution of long chain alkyl modified Poval (MP-203, produced by Kuraray Co. LTD.: "Poval" is a trade name) is applied and then dried at 90° C. for 4 minutes. Thereafter, the polymer layer for forming the orientation layer having the thickness of 2.0 μm is formed. The transporting velocity of the continuous film is 20 m/min.

In the continuous film of triacetyl cellulose, nx and ny are determined as refractive index according to two perpendicular directions in a film surface, nz as that according to a thickness direction, and d as thickness of the continuous film. The continuous film satisfies the following formulae:

$$(nx-ny)\times d=16\text{ nm},$$

$$\{(nx-ny)/2-nz\}\times d=75$$

The formation of the polymer layer for the orientation layer is performed in a coating/drying line in which the drying apparatus of the present invention is provided. In the drying apparatus, the transport angle θ1 at the entrance of the drying apparatus is 90°, and the transport angle θ3 at the exit of the drying apparatus is 84°.

The continuous film on which the polymer layer is formed is transported at 20 m/min of transport speed, and simultaneously the surface of the polymer layer is rubbed. In this rubbing process, a rubbing roller is used and rotated at 300 rpm. Thereafter, dusts are removed from the obtained orientation layer.

The continuous film having the orientation layer is transported at 20 m/min, and a 10 wt. % mixture solution of a mixture in methylethylketone is applied as the coating solution to the orientation layer with use of a wire bar coater as the coating apparatus. The mixture is prepared as follows: discotic compounds TE-(1) and TE-(2) (see, chemical formula CH1) are mixed in a weight ratio of 4:1, and a photo initiator (IRGACURE 907, produced by Ciba Geigy Japan Limited.) is added to 1 wt. % to the mixed discotic compounds to obtain the mixture. The coating speed is 20 m/min, and the coating volume is 5 cc/m$^2$, and the continuous film is transported through the drying zone and the heating zone. In the drying zone, a wind is fed, and the temperature of the heating zone is adjusted to 130° C. After three seconds from the coating, the coated part of the continuous film enters in the drying zone, and further fed after three seconds into the heating zone.

TE

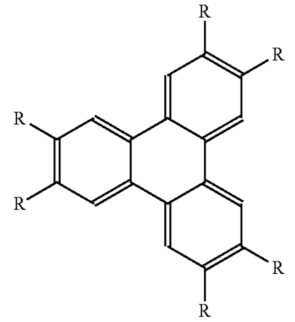

(1)

R: 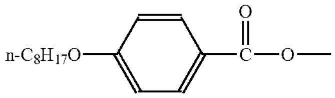

(2)

R: 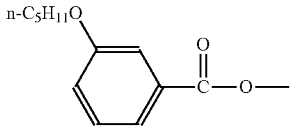

After the heating zone, the continuous film on which the liquid crystal layer and the orientation layer are formed is continuously transported at a transport speed of 20 m/min, and a UV ray (illuminance: 600 mW) is radiated on a surface of the liquid crystal layer with use of the UV ray radiating device (Power of UV lamp: 160 W/cm, wavelength of the UV ray: 1.6 m). Thus the cross-linking of the liquid crystal compounds in the liquid crystal layer is made.

In Examples 2-4 and Comparisons 1-5, the optical compensation films are produced while the coating method and the transporting angles are varied. The other conditions are the same as Example 1. The estimations of the Examples 1-4 and Comparisons 1-5 are made, and the grade of the estimation is Good when the unevenness is not generated in the drying process and the quality of the coating layer is good, and Refused when the unevenness is generated in the drying process, the coating layer is not smooth, and the quality of the coating layer is wrong.

The conditions and the results of the Examples and the Comparisons are shown in Table 1. Note that in wire bar coating, the coating of the solution is made in a lower surface of the web, and the web is guided by a roller such that the coating surface of the web is disposed in upper side. In this situation the drying of the web is made.

TABLE 1

| | | Condition of Transporting Film | | | |
|---|---|---|---|---|---|
| | Coating Method | Position of CS | Entrance Angle θ 1° | Exit Angle θ 2° | Estimation |
| Ex. 1 | Extrusion | Upside | 90 | 84 | Good |
| Ex. 2 | Extrusion | Upside | 80 | 70 | Good |
| Ex. 3 | Extrusion | Upside | 65 | 60 | Good |

TABLE 1-continued

| | | Condition of Transporting Film | | | |
|---|---|---|---|---|---|
| | Coating Method | Position of CS | Entrance Angle θ 1° | Exit Angle θ 2° | Estimation |
| Ex. 4 | Wire Bar | Upside | 75 | 70 | Good |
| Co. 1 | Extrusion | Upside | 0 | 0 | Refused |
| Co. 2 | Extrusion | Upside | 15 | 20 | Refused |
| Co. 3 | Wire Bar | Downside | 0 | 0 | Refused |
| Co. 4 | Wire Bar | Downside | 45 | 45 | Refused |
| Co. 5 | Extrusion | Upside | 40 | 30 | Refused |

Experiment 2

In Experiment 2, the coating/drying line 60 of FIG. 5 is used. Note that, when the heating devices are used in the drying apparatus 66, the temperatures at the entrance and at the exit are respectively set to 25° C. and to 21° C. The transporting angles are fixed, and the drying conditions are varied between Examples 5-7 and Comparisons 6-8. Other conditions are the same as Experiment 1. The estimations of the Examples 5-7 and Comparisons 6-8 are made. Table 2 shows the drying conditions and the results of the grade of the estimations. The drying condition is: "All", three heaters are used; Part, a part of the three heaters are used; None, no heater is used. and the grade of the estimation is: Good when the unevenness is not generated in the drying process and the quality of the coating layer is good, and Refused when the unevenness is generated in the drying process, the coating layer is not smooth, and the quality of the coating layer is wrong.

TABLE 2

| | Condition of Coating | Temperature of Coating Layer (° C.) | | | |
|---|---|---|---|---|---|
| | Apparatus | Entrance | Inside | Exit | Estimation |
| Ex. 5 | All | 25 | Not Measured | 21 | Good |
| Ex. 6 | All | 25 | Max 25/Min 21 | 21 | Good |
| Ex. 7 | All | 25 | Not Measured | 27 | Good |
| Co. 6 | None | 25 | Not Measured | 18 | Refused |
| Co. 7 | Part | 25 | Max 25/Min 18 | 21 | Refused |
| Co. 8 | All | 25 | Not Measured | 31 | Refused |

Experiment 3

In Experiment 3, the drying apparatus of FIG. 2 is used. The heat-developable photosensitive materials (or the photo film) of Example 8, Comparison 9 are produced in the film production line. In a drying process of the film production line are sequentially disposed both of the drying apparatus and the blow-drying apparatus as a drying means for dry and recovery of the organic solvent. In Example 8 and Comparison 9, the transporting direction in the drying apparatus is set such that the non-coating surface of the substrate may be upward. Thereby, and the transporting angles are 90° and 60° in Example 8, and 15° and 0° in Comparison 9. Then Example 8 and Comparison 9 are compared with each other.

The coating solution to be applied to the web for heat-developable photosensitive material are as follows:

1) Preparation of Silver Halide Emulsion 22 g phthalated gelatin and 30 mg KBr are dissolved to 700 ml water at 35° C., such that pH may be 5. To this solution are added a 159 ml aqueous solution of 18.6 g $AgNO_3$ and an aqueous solution of KBr and KI in 92:8 of mol ratio in a double jetting method for 10 minutes, such that pAg is kept at 7.7. Then to this solution are added a 476 ml aqueous solution of 55.4 g $AgNO_3$ and an aqueous solution of 10.5 μmol/l secondary potassium hexachloro iridiate and 1 mol/l KBr in a double jetting method for 30 minutes, such that pAg is kept at 7.7. Thereafter, pH value is decreased, and KBr and KI cohesion and sediment. Then, demineralization is performed, and 0.11 g phenoxyethanol is added, and the pH value and pAg value are respectively adjusted to 5.9 and 8.2. And after the KBr and KI particles accumulate in the lower side, the liquids are removed, and the KBr and KI particles are washed. Thus the AgBrI particles (8 mol % core containing iodine; averaged 2 mol %; average size 0.05 μm; coefficient of variation of projection area 8%; cubic particles in 90% of ratio of (100) surface) is prepared. The obtained silver halide particles are warmed to have a temperature 60° C. Thus, corresponding to 1 mol Ag in the silver halide particles, 85 μmol sodium thiosulfate, 11 μmol 2,3,4,5,6-pentafluorophenyl diphenyl phosphine selenide, 15 μmol tellurium compounds, 3.6 μmol chlorogoldinic acid, 280 μmol thiocyanic acid are added to the warmed silver halide particle. The ripening of the silver halide particles are made for 120 minutes, and thereafter cooled to have the temperature of 30° C. Thus the silver halide emulsion is obtained.

2) Preparation of Organic Acid Silver Emulsion 1.3 g stearic acid, 0.5 g arachidic acid, 8.5 g behenic acid, 300 ml distillated water are mixed at 90° C. for 40 minutes, and then the mixture is strongly stirred to simultaneously add 31.1 ml 1N—NaOH aqueous solution for 15 minutes. Thereafter, the temperature of the mixture is increased to 30° C., and 7 ml 1N-phosphoric acid is added to the mixture. Then the mixture is strongly stirred to simultaneously add 0.012 g N-bromosuccineimide. Thereafter, the silver halide emulsion is added such that 2.5 mmol silver halide may be contained. Further, 25 ml 1N-silver nitrate aqueous solution is added to the mixture for 25 minutes, and then the mixture is stirred for 90 minutes. Thereafter, the suction filtration is made to separate the solid material from the liquid. Further the solid material is washed with water until the conductivity of the waste water of washing the solid material becomes 30 μS/cm. To the solid material, 37 g of 1.2 wt. % solution of polyvinylacetate in butyl acetate is added. Then, after stirred, the mixture is left stationary, and separates into an oil phase and a water phase. The water phase, to which salts are dissolved, is removed to obtain the oil phase. To the oil phase, 20 g of 2.5 wt. % solution of polyvinylbutyral in 2-butanone is added. Further, 0.1 mmol pyridinium perbromide, 0.18 mmol calcium bromide dihydrate are added with 0.7 g methanol to the oil phase. And thereafter 40 g 2-butanone and 7.8 g polyvinylthylal are added to the oil phase, and the dispersion of the oil phase is performed with use of homogenizer to obtain an emulsion of the silver slat of the organic acid (averaged minimal diameter 0.04 μm; averaged maximal diameter 1 μm; needle like shaped particles having coefficient of variation of projection area 30%).

3) Preparation of Coating Solution for Emulsion Layer

In order to obtain the coating solution for forming an emulsion layer, following materials or compounds with amount to one mol Ag are added to the organic materials in the following processes. The emulsion of the silver salt of organic acid is stirred at 25° C., and to the organic acid silver emulsion are thereby added 10 mg sodium phenyl thiosulfonate, 68 mg coloring matter 1, 30 mg coloring matter 2, 2 g 2-melcapt-5-methylbenzoimidazol, 21.5 g 4-chlorobenzophenone-2-carboxylic acid, 580 g 2-butanon, and 220 g dimethylformamide. Thereafter this mixture is left stationary for 3 hours. Then the emulsion of the silver salt of organic acid is stirred, and to the emulsion are thereby added 8 g 5-tribromomethyl sulfonyl-2-methylthiadiazol, 6 g 2-tribromomethylsulfonyl benzothiazol, 5 g 4,6-ditrichloromethyl-2-phenyltriadine, 2 g disulfide compounds, 160 g 1,1-bis(2-hydroxy-3-5-dimethylphenyl)-3,5,5-trimethylhexane, 5 g tetrachloro-phthalic acid, 1.1 g fluoride type surfactant, 590 g 2-butanone, and 10 g methylisobutylketone.

175 μm of a substrate of polyethylenetelelphthalate (PET) that has colored taste with use of a blue dye is used as the web. The substrate is coated with the coating solution for forming the emulsion layer that is prepared as described above, such that the surface density of the silver may be 2.3 $g/cm^2$.

The transporting direction in the drying apparatus is set such that, in Example 8, the respective entrance and exit angles of the drying apparatus may be 90° and 60°, and in Comparison 9, 15° and 0°. The condition of the surface of the product of Example 8 is good, and that of the Comparison 9 is bad as there are influences of the generation of the unevenness in the unexpected blow.

Experiment 4

In Experiment 3, the drying apparatus of FIG. 5 is used. In Example 9, the difference of the temperature between the entrance and the exit is set to 2° C., and in Comparison 10 the temperature to 7° C. without use of the heater in the drying apparatus.

The coating solution to be applied to the web for heat-developable photosensitive material are as follows:

1) Preparation of Silver Halide Emulsion 22 g phthalated gelatin and 30 mg KBr are dissolved to 700 ml water at 35° C., such that pH may be 5. To this solution are added a 159 ml aqueous solution of 18.6 g $AgNO_3$ and an aqueous solution of KBr and KI in 92:8 of mol ratio in a double jetting method for 10 minutes, such that pAg is kept at 7.7. Then to this solution are added a 476 ml aqueous solution of 55.4 g $AgNO_3$ and an aqueous solution of 10.5 μmol/l secondary potassium hexachloro iridiate and 1 mol/l KBr in a double jetting method for 30 minutes, such that pAg is kept at 7.7. Thereafter, pH value is decreased, and KBr and KI cohesion and sediment. Then, demineralization is performed, and 0.11 g phenoxyethanol is added, and the pH value and pAg value are respectively adjusted to 5.9 and 8.2. And after the KBr and KI particles accumulate in the lower side, the liquids are removed, and the KBr and KI particles are washed. Thus the AgBrI particles (8 mol % core containing iodine; averaged 2 mol %; average size 0.05 μm; coefficient of variation of projection area 8%; cubic particles in 90% of ratio of (100) surface) is prepared. The obtained silver halide particles are warmed to have a temperature 60° C. Thus, corresponding to 1 mol Ag in the silver halide particles, 85 μmol sodium thiosulfate, 11 μmol 2,3,4,5,6-pentafluorophenyl diphenyl phosphine selenide, 15 μmol tellurium compounds, 3.6 μmol chlorogoldinic acid, 280 μmol thiocyanic acid are added to the warmed silver halide particle. The ripening of the silver halide particles are made for 120 minutes, and thereafter cooled to have the temperature of 30° C. Thus the silver halide emulsion is obtained.

2) Preparation of Organic Acid Silver Emulsion 1.3 g stearic acid, 0.5 g arachidic acid, 8.5 g behenic acid, 300 ml distillated water are mixed at 90° C. for 40 minutes, and then the mixture is strongly stirred to simultaneously add 31.1 ml 1N—NaOH aqueous solution for 15 minutes. Thereafter, the temperature of the mixture is increased to 30° C., and 7 ml 1N-phosphoric acid is added to the mixture. Then the mixture is strongly stirred to simultaneously add 0.012 g N-bromosuccineimide. Thereafter, the silver halide emulsion is added such that 2.5 mmol silver halide may be contained. Further, 25 ml 1N-silver nitrate aqueous solution is added to the mixture for 25 minutes, and then the mixture is stirred for 90 minutes. Thereafter, the suction filtration is made to separate the solid material from the liquid. Further the solid material is washed with water until the conductivity of the waste water of washing the solid material becomes 30 μS/cm. To the solid material, 37 g of 1.2 wt. % solution of polyvinylacetate in butyl acetate is added. Then, after stirred, the mixture is left stationary, and separates into an oil phase and a water phase. The water phase, to which salts are dissolved, is removed to obtain the oil phase. To the oil phase, 20 g of 2.5 wt. % solution of polyvinylbutyral in 2-butanone is added. Further, 0.1 mmol pyridinium perbromide, 0.18 mmol calcium bromide dihydrate are added with 0.7 g methanol to the oil phase. And thereafter 40 g 2-butanone and 7.8 g polyvinylthylal are added to the oil phase, and the dispersion of the oil phase is performed with use of homogenizer to obtain an emulsion of the silver slat of the organic acid (averaged minimal diameter 0.04 μm; averaged maximal diameter 1 μm; needle like shaped particles having coefficient of variation of projection area 30%).

3) Preparation of Coating Solution for Emulsion Layer

In order to obtain the coating solution for forming an emulsion layer, following materials or compounds with amount to one mol Ag are added to the organic materials in the following processes. The emulsion of the silver salt of organic acid is stirred at 25° C., and to the organic acid silver emulsion are thereby added 10 mg sodium phenyl thiosulfonate, 68 mg coloring matter 1, 30 mg coloring matter 2, 2 g 2-melcapt-5-methylbenzoimidazol, 21.5 g 4-chlorobenzophenone-2-carboxylic acid, 580 g 2-butanon, and 220 g dimethylformamide. Thereafter this mixture is left stationary for 3 hours. Then the emulsion of the silver salt of organic acid is stirred, and to the emulsion are thereby added 8 g 5-tribromomethyl sulfonyl-2-methylthiadiazol, 6 g 2-tribromomethylsulfonyl benzothiazol, 5 g 4,6-ditrichloromethyl-2-phenyltriadine, 2 g disulfide compounds, 160 g 1,1-bis(2-hydroxy-3-5-dimethylphenyl)-3,5,5-trimethylhexane, 5 g tetrachloro-phthalic acid, 1.1 g fluoride type surfactant, 590 g 2-butanone, and 10 g methylisobutylketone.

175 μm of a substrate of polyethylenetelelphthalate (PET) that has colored taste with use of a blue dye is used as the web. The substrate is coated with the coating solution for forming the emulsion layer that is prepared as described above, such that the surface density of the silver may be 2.3 $g/cm^2$. in Example 9, the drying is made at first in the drying apparatus in which the solvent is condensed and recovered, and thereafter in the blow-drying apparatus. Thereafter the UV-ray is irradiated onto the coating surface of the substrate, and thus the heat developing photosensitive material is obtained. Otherwise, in Comparison 10, the dryers are not used in the heating apparatus, and the gel-like film is transported in the condition of the difference of the temperature is 7, and then the drying in the blow-drying apparatus follows. Thereafter the UV-ray is irradiated onto the coating surface of the substrate, and thus the heat developing photosensitive material is obtained.

The condition of the surface of the product of Example 9 is good, and that of the Comparison 10 is bad as there are influences of the generation of the unevenness in the unexpected blow.

Various changes and modifications are possible in the present invention and may be understood to be within the present invention.

The invention claimed is:

1. A drying method for drying a coating layer which is formed by coating a moving web with a coating solution containing organic solvent, comprising steps of:

drying said web by a drying device which comprises a casing surrounding the web at a transporting position just after the coating and before a blow drying apparatus, so as to prevent wind disturbance close to a coating surface, wherein the casing is tightly closed such that a wind velocity is at most 0.1 m/s when the web is not transported in the drying device, the web being transported almost perpendicularly inside the casing;

heating with a heating device which is disposed within the casing, such that a temperature difference $|T2-T1|$ between a temperature T1 of said coating layer at the entrance of said casing and a temperature T2 of said coating layer at the exit of said casing at most 5° C., wherein at least 70% by mass of said organic solvent in said coating solution is dried in said drying device; and further drying said coating layer by the blow drying apparatus disposed downstream from said drying device and disposed outside said casing, wherein a web guide roller is disposed within said casing and said guide roller is a roller whose temperature is controlled to facilitate drying.

2. The drying method as claimed in claim 1, wherein said heating device heats so that a temperature difference $|T3-T1|$ between said temperature T1 of said coating layer at said entrance of said drying device and a temperature T3 of said coating layer T3 of said coating layer in said drying device is at most 5° C.

3. The drying method as claimed in claim 1, wherein said drying is performed while a solvent vapor above the coating surface within said casing is kept at a concentration in a middle of the casing during drying.

4. The drying method as claimed in claim 1, wherein said drying device is disposed downstream at most 0.7 m after the coating.

5. The drying method as claimed in claim 1, wherein a device for condensing and recovering a solvent vapor of said organic solvent evaporated from said coating layer is disposed at said coating surface at a transporting position of said web within said drying device.

6. The drying method as claimed in claim 1, wherein a content of said organic solvent in said coating solution is at least 50% by mass.

7. The drying method as claimed in claim 1, wherein an infrared ray heater is used as said heating device.

8. The drying method as claimed in claim 7, wherein said infrared ray heater has a box shape.

9. The drying method as claimed in claim 7, wherein said infrared ray heater is disposed 10 mm to 50 mm apart from said web.

10. The drying method as claimed in claim 1, wherein a temperature of water is controlled in a range of 40° C. to 80° C. with use of an infrared ray heater, and said water is used in said heating device.

11. The drying method as claimed in claim 1, wherein a thickness of a wet coating layer is at most 50 μm.

12. The drying method as claimed in claim 1, wherein transport angles include transport angle $\theta_1$ at an entrance of the drying device, transport angle $\theta_2$ in the casing and transport angle $\theta_3$ at an exit of the drying device, and satisfy:

$$60° \leq \theta_3 \leq \theta_2 \leq \theta_1 \leq 90°.$$

* * * * *

13. The drying method as claimed in claim 1, wherein a transport speed of the web in the drying device is from 1 m/min to 100 m/min.

14. The drying method as claimed in claim 1, wherein the drying device is provided with a wind meter configured to measure the wind velocity inside the drying apparatus.

* * * * *